(12) United States Patent
Yang

(10) Patent No.: US 7,150,525 B1
(45) Date of Patent: Dec. 19, 2006

(54) EASILY ASSEMBLED AND DETACHED EYEGLASS

(76) Inventor: Win-Lin Yang, P.O. Box 90, Tainan City 70499 (TW)

( * ) Notice: Subject to any disclaimer, the term of this patent is extended or adjusted under 35 U.S.C. 154(b) by 0 days.

(21) Appl. No.: 11/417,099

(22) Filed: May 4, 2006

(51) Int. Cl.
*G02C 1/00* (2006.01)

(52) U.S. Cl. .......................... 351/86; 351/83; 351/103; 351/106

(58) Field of Classification Search ................... 351/86, 351/83, 106, 103, 110, 41
See application file for complete search history.

(56) References Cited

U.S. PATENT DOCUMENTS 6,280,030 B1 * 8/2001 Chen ........................... 351/86

\* cited by examiner

*Primary Examiner*—Hung Xuan Dang

(57) ABSTRACT

An eyeglass comprises a eyeglass frame having a nose bridge frame at a middle portion of the eyeglass frame; an inner side of the nose bridge frame having two U shape embedding grooves; an inner side of each embedding groove being an attaching surface; a lower side of the nose bridge frame being formed with a nose pad; a front surface of the nose pad being formed as a resisting surface; a front surface of the eyeglass frame at two sides of the nose bridge frame being formed as an adhering surface; two eyeglass legs being connected to the eyeglass frame; and a lens assembled to the eyeglass frame; a middle section of the lens being a nose bridge portion; and two upper sides of the nose bridge portion being formed with respective adhering portions which can be adhered to the adhering surface of the eyeglass frame.

1 Claim, 3 Drawing Sheets

EASILY ASSEMBLED AND DETACHED EYEGLASS

FIELD OF THE INVENTION

The present invention relates to an eyeglass, where the lens of the eyeglass can be updated easily. The user can update the lens by himself (or herself) easily and rapidly.

BACKGROUND OF THE INVENTION

In the prior art eyeglass, the eyeglass frame has two openings at two sides. Two sides of each opening have formed with fixing seats which are locked by a screw for fixing a lens to the frame. If it is desired to take out the lens in the frame, it is necessary to release the screw and then the lens is taken out. It is time and labor consumed. Thereby it is possible that the screw is loosed, and thus the screw falls out. As a result the lens falls out.

Another kind of eyeglass, plastic eyeglass, has an integral formed frame. If it is desired to install the lens into the frame, the frame must be heated. However this way is not provided with the function of updating the lens easily and conveniently so that the user can update the lens by himself (or herself).

Thus, above prior art ways have no function of updating lens of different colors to satisfy the requirement of users.

SUMMARY OF THE INVENTION

Accordingly, the primary object of the present invention is to provide an eyeglass, where the lens of the eyeglass can be updated easily. The user can update the lens by himself (or herself) easily and rapidly.

To achieve above objects, the present invention provides an eyeglass which comprises a cambered eyeglass frame having a nose bridge frame at a middle portion of the eyeglass frame; an inner side of the nose bridge frame having two U shape embedding grooves; an inner side of each embedding groove being an attaching surface; the nose bridge frame being formed with a via hole; a lower side of the nose bridge frame being formed with a nose pad; a front surface of the nose pad being formed as a resisting surface; a front surface of the eyeglass frame at two sides of the nose bridge frame being formed as an adhering surface; two eyeglass legs being connected to the two ends of the eyeglass frame; and a lens assembled to the eyeglass frame; the lens being an integral formed structure; a middle section of the lens being a nose bridge portion which can be embedded to the U shape embedding grooves of the nose bridge frame of the eyeglass frame and being adhered to the attaching surface of the embedding groove; two lateral sides of the nose bridge portion being protruded with two resisting portions for adhering to the resisting surface at the front side of the nose pad; two upper sides of the nose bridge portion being formed with respective adhering portion which adheres to the adhering surface at the front end of the eyeglass frame.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
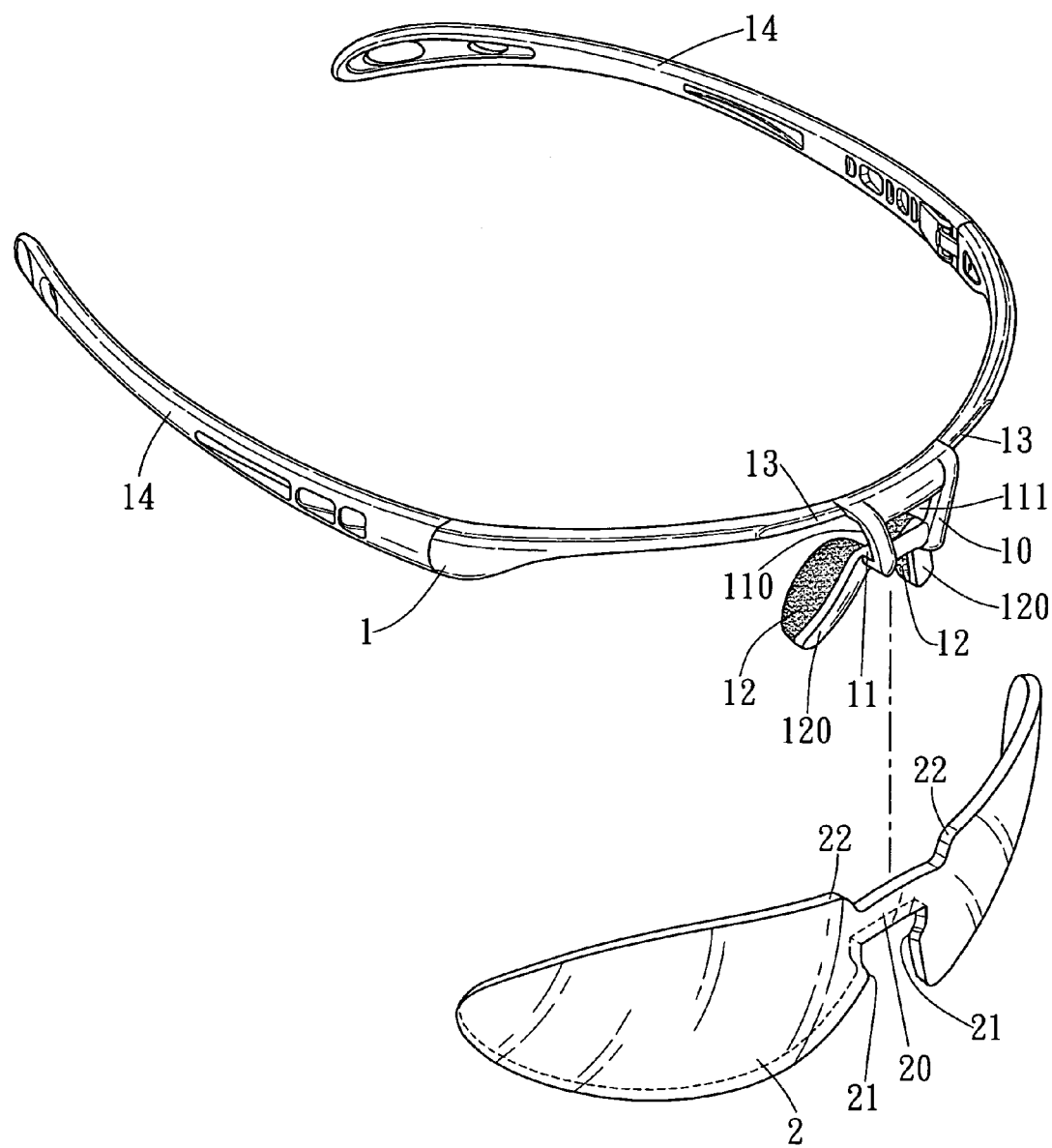
FIG. 1 is an exploded perspective view of the present invention.
Figure 2:
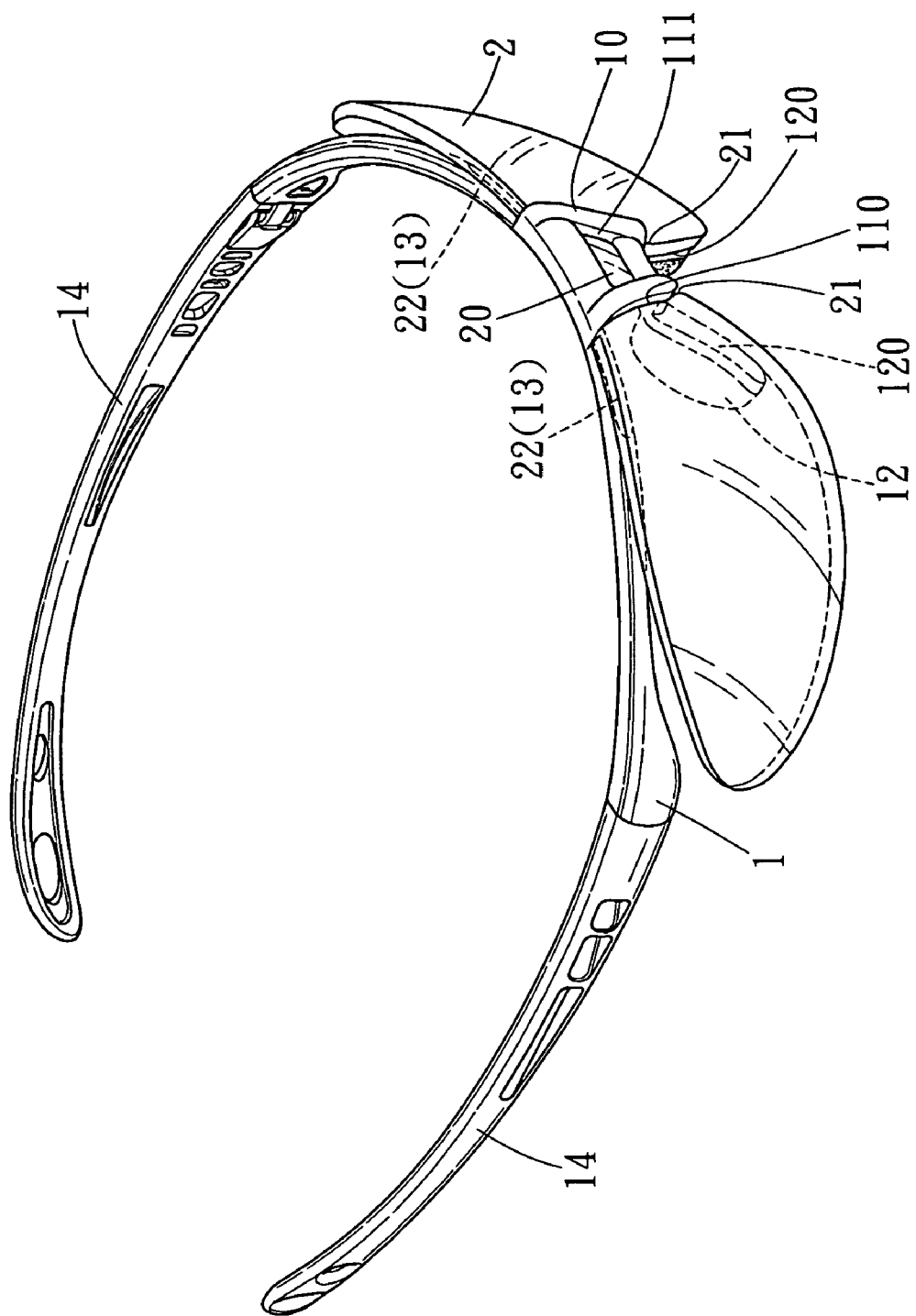
FIG. 2 is an assembled perspective view of the present invention.

Referring to FIGS. 1 to 2, the present invention is illustrated. The present invention has the following elements.

A cambered eyeglass frame 1 has a nose bridge frame 10 at a middle portion of the eyeglass frame 1. An inner side of the nose bridge frame 10 has two U shape embedding grooves 11. An inner side of each embedding groove 11 is an attaching surface 110. The nose bridge frame 10 is formed with a via hole 111. A lower side of the nose bridge frame 10 is formed with a nose pad 12. A front surface of the nose pad 12 is formed as a resisting surface 120. A front surface of the eyeglass frame 1 at two sides of the nose bridge frame 10 are formed as an adhering surface 13. Two eyeglass legs 14 are connected to the two ends of the eyeglass frame 1.

A lens 2 is assembled to the eyeglass frame 1. The lens 2 is an integral formed structure. A middle section of the lens 2 is a nose bridge portion 20 which can be embedded to the U shape embedding grooves 11 of the nose bridge frame 10 of the eyeglass frame 1 and is adhered to the attaching surface 110 of the embedding groove 11. Two lateral sides of the nose bridge portion 20 are protruded with two resisting portions 21 for adhering to the resisting surface 120 at the front side of the nose pad 12. Two upper sides of the nose bridge portion 20 are formed with respective adhering portions 22 which adhere to the adhering surface 13 at the front end of the eyeglass frame 1.

Figure 3:
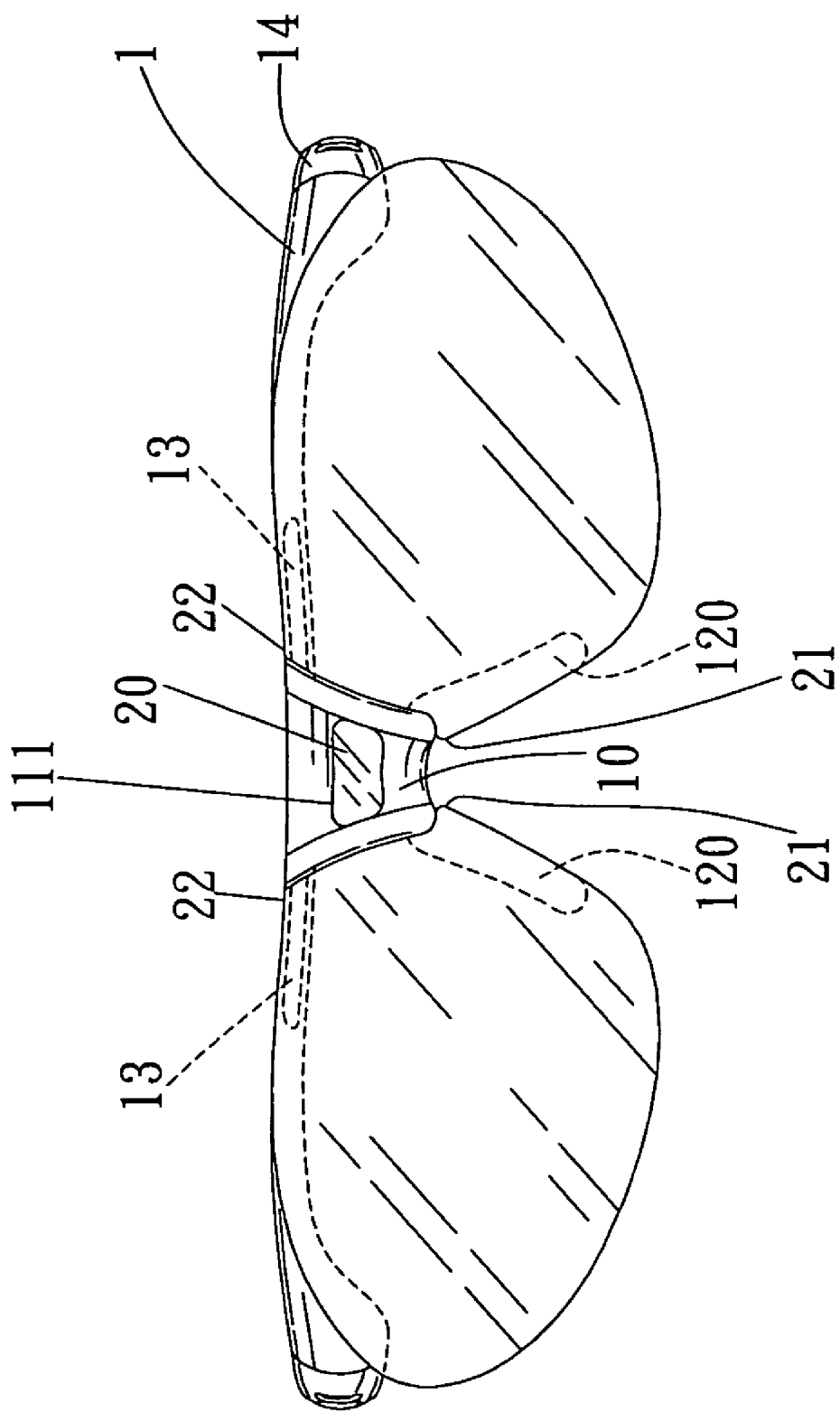
FIG. 3 is an assembled front view of the present invention.

In assembly, referring to FIGS. 1 to 3, at first, the nose bridge portion 20 is embedded into the U shape embedding grooves 11 of the nose bridge frame 10 and adhered to the attaching surface 110 at the inner side of the embedding grooves 11. Next, the resisting portions 21 at the two lower sides of the nose bridge portion 20 resist against the resisting surface 120 of the nose pad 12. The adhering portions 22 of the lens 2 are adhered to the adhering surface 13 of the eyeglass frame 1. Therefore, the assembly of the present invention is completed.

When it is desired to update the lens 2, the adhering portion 22 of the lens 2 is pushed away from the adhering surface 13 of the eyeglass frame 1 and the nose bridge portion 20 of the lens 2 is pushed out from the U shape embedding grooves 11 of the eyeglass frame 1. Then the lens 2 can be taken down easily. Thus, the lens 2 can be detached easily.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An eyeglass comprising:
   a cambered eyeglass frame having a nose bridge frame at a middle portion of the eyeglass frame; an inner side of the nose bridge frame having two U shape embedding grooves; an inner side of each embedding groove being an attaching surface; the nose bridge frame being formed with a via hole; a lower side of the nose bridge frame being formed with a nose pad; a front surface of the nose pad being formed as a resisting surface; a front surface of the eyeglass frame at two sides of the nose bridge frame being formed as an adhering surface; two eyeglass legs being connected to the two ends of the eyeglass frame; and a lens assembled to the eyeglass frame; the lens being an integral formed structure; the lens being formed with two sides; each side having a sub-lens; the two sub-lens being connected by a middle section; each sub-lens having a straight upper side and a long and narrow shape which transversally extends from the middle section to the two ends of the lens; the middle section of the lens being a nose bridge portion which can be embedded to the U shape embedding grooves of the nose bridge frame of the eyeglass frame and being adhered to the attaching surface of the embedding groove; two lateral sides of the nose bridge portion being protruded with two resisting portions which can be adhered to the resisting surface at the front side of the nose pad; and two upper sides of the nose bridge portion being formed with respective adhering portions which adheres to the adhering surface at the front end of the eyeglass frame.

* * * * *